(12) United States Patent
Seifer

(10) Patent No.: US 7,633,888 B1
(45) Date of Patent: Dec. 15, 2009

(54) SYSTEM AND METHOD TO CONFIGURE A NETWORK NODE

(75) Inventor: Jeffrey D. Seifer, Andover, MA (US)

(73) Assignee: S2 Security Corporation, Wellesley, MA (US)

( * ) Notice: Subject to any disclaimer, the term of this patent is extended or adjusted under 35 U.S.C. 154(b) by 448 days.

(21) Appl. No.: 11/536,246

(22) Filed: Sep. 28, 2006

Related U.S. Application Data

(60) Provisional application No. 60/736,625, filed on Nov. 15, 2005.

(51) Int. Cl.
*H04L 12/28* (2006.01)
*H04L 12/56* (2006.01)

(52) U.S. Cl. .................. 370/254; 370/390; 370/392; 379/900

(58) Field of Classification Search .......... 370/254, 370/401, 252; 709/203, 220–222, 219
See application file for complete search history.

(56) References Cited

U.S. PATENT DOCUMENTS

| | | | |
|---|---|---|---|
| 5,884,024 A * | 3/1999 | Lim et al. ............... 726/3 | |
| 6,345,294 B1 | 2/2002 | O'Toole et al. | |
| 6,571,095 B1 | 5/2003 | Koodli | |
| 6,587,882 B1 | 7/2003 | Inoue et al. | |
| 6,611,872 B1 | 8/2003 | McCanne | |
| 6,629,145 B1 | 9/2003 | Pham et al. | |
| 6,697,862 B1 | 2/2004 | Beser et al. | |
| 6,757,723 B1 | 6/2004 | O'Toole et al. | |
| 6,768,722 B1 | 7/2004 | Katseff et al. | |
| 6,775,273 B1 | 8/2004 | Kung et al. | |
| 6,779,004 B1 | 8/2004 | Zintel | |
| 6,839,757 B1 | 1/2005 | Romano et al. | |
| 2005/0238046 A1* | 10/2005 | Hassan et al. ............... 370/465 | |
| 2007/0004436 A1* | 1/2007 | Stirbu ................. 455/503 | |
| 2007/0035632 A1* | 2/2007 | Silvernail et al. ........ 348/211.3 | |

OTHER PUBLICATIONS

Cheshire, S. et al., Dynamic Configuration of IPv4 Link-Local Addresses,http://files.zeroconf.org/draft-ietf-zeroconf-ipv4-linklocal.txt, Jul. 8, 2004.
Williams, A., Requirements for Automatic Configuration of IP Hosts, http://files.zeroconf.org/draft-ietf-zeroconf-reqs-12.txt, Sep. 19, 2002.
Guttman, Erik, Autoconfiguration for IP Networking: Enabling Local Communication, IEEE Internet Computing, pp. 81-86, May-Jun. 2001.
Catrina, Octavian,et al., Zeroconf Multicast Address Allocation Protocol (ZMAP), http://files.zeroconf.org/draft-ietf-zeroconf-zmap-02.txt, Apr. 22, 2002.
Hards, Brad, Zeroconf Networking, Linux.cong.au, Jan. 22, 2003.

* cited by examiner

*Primary Examiner*—Gregory B Sefcheck
*Assistant Examiner*—Nima Mahmoudzadeh
(74) *Attorney, Agent, or Firm*—Chapin IP Law, LLC

(57) ABSTRACT

An integrated security system operating over a network includes at least one network node coupled to the network which includes a unique identifier and a control program executable by said network node. The system further includes a network controller coupled to the network including a control program executable by the network controller which in response to a message including the unique identifier from the network node directs the network node to obtain a network configuration including a network address using one of several address assignment methods.

20 Claims, 13 Drawing Sheets

SYSTEM AND METHOD TO CONFIGURE A NETWORK NODE

CROSS-REFERENCE TO RELATED APPLICATIONS

This application claims the benefit of U.S. Provisional Application No. 60/736,625, filed on Nov. 15, 2005 which application is hereby incorporated herein by reference in its entirety.

STATEMENTS REGARDING FEDERALLY SPONSORED RESEARCH

Not applicable.

FIELD OF THE INVENTION

This invention relates generally to security systems and more particularly to security systems including network enabled nodes.

BACKGROUND OF THE INVENTION

In security applications, separate systems are often needed to provide access control, burglar alarm, and audio and video capabilities at access points in an individual office or a facility including one or more buildings. An integrated network based security system such as that described in U.S. Pat. No. 7,467,400 issued Dec. 16, 2008, and assigned to the assignee of the present application, combines these features into a single system using one or more network controllers and multiple network enabled nodes, also referred to as network nodes or nodes, placed at access points and locations where monitoring and surveillance is desired. Network enabled nodes include devices which provide access control, environmental monitoring, video surveillance, video recording and audio intercom functionality and which communicate over a network. Access control systems include alarm systems and physical access systems. Security systems for larger facilities often require supervision of numerous access points some of which may be on a private LAN, a corporate LAN, a virtual LAN (VLAN), a virtual private network (VPN), or the Internet.

The installation and the operation of an integrated network based security system are often complicated by network topologies which span more than a single local area network (LAN) or subnet. Another problem, relating to the operation of the integrated network based security system, is the control and addressing of the various individual nodes from one or more network controllers. Managing the configuration of the network nodes is further complicated by the requirement for configuration and operation over various network topologies including the configuration of network nodes on networks separate from a corresponding network controller for example where the network node and the network controller communicate over the Internet. A conventional technique such as multicasting allows a group of receivers located anywhere on the Internet to share a data stream using the IGMP protocol. Another conventional technique, Zeroconf, is used to allocate addresses without a DHCP server. Although Zeroconf automatically assigns addresses, the addresses are ephemeral and may change when a network node is restarted.

Some conventional systems, such as that described in U.S. Pat. No. 6,757,723, issued Jun. 29, 2004 entitled "Methods and apparatus for remote configuration of an appliance on a network" configure a network appliance from a remote location but do not attempt to attempt to configure network nodes controlled by the appliance. It would, therefore, be desirable to provide an integrated security system including distributed control, monitoring, audio and video devices operating over a distributed network topology. It would be further desirable to provide a method to configure network nodes to enable control across the Internet or a wide area network to simplify the security system installation.

SUMMARY OF THE INVENTION

In accordance with the present invention, a security system operating over a network includes at least one network node coupled to the network that includes a unique identifier (UID), a control program executable by said network node. The system further includes a network controller coupled to the network including a control program executable by the network controller which in response to a message including the unique identifier from the at least one network node directs said network node to obtain a network configuration including a network address using one of a plurality of address assignment methods.

In one embodiment the network controller has a relational database including configuration information represented in at least one table in the relational database. The system further includes at least one network node having a process adapted to receive predetermined application configuration information from the relational database. With such an arrangement, the configuration on the network node is facilitated by the transfer of the configuration information including network addressing information. This arrangement reduces the number of installation tasks and simplifies the security system installation. In one embodiment, an extensible markup language, XML, is used to represent predetermined configuration information transmitted between the network controller and the network nodes. In this embodiment, a security system administrative user can configure the networks nodes using a standard web browser that operates on a variety of computer platforms. This provides a zero footprint programming model whereby no installed components of software are required on an administrative user's PC.

In accordance with another aspect of the invention a method to configure a network node includes the steps of reading a token to obtain a unique identifier, broadcasting the unique identifier in a message requesting an address assignment method, determining an address assignment method in response to receiving the message, and obtaining a network address using the address assignment method. With such a technique, network nodes can be configured without direct user intervention at the network node by using the standard web browser in communication with a web server running on the network controller.

In accordance with a further aspect of the invention a method to configure a network node which is not co-located with a network controller includes the steps of determining whether a network node is available for possible configuration; receiving an initial network node configuration; providing an address assignment method, and providing a method to discover a corresponding network controller address. With such a technique, network nodes can be configured to interoperate with the network controllers of the integrated security system over the Internet. A user interface provides a list of addressable network nodes, accepts network node configuration information and distributes network configuration information to selected nodes from the list of addressable nodes.

BRIEF DESCRIPTION OF THE DRAWINGS

In the drawings, like reference characters generally refer to like features and structural elements throughout the various figures. The following drawings are illustrative of embodiments of the invention and are not meant to limit the scope of the invention as encompassed by the claims. The foregoing features of this invention, as well as the invention itself, may be more fully understood from the following description of the drawings in which:

DETAILED DESCRIPTION OF THE INVENTION

Before providing a detailed description of the invention, it may be helpful to define some of the terms used in the description. The term "network enabled" as used herein refers generally to a device or system which communicates over network media using an open system transport and data protocol, for example the TCP/IP protocol over a variety of physical media, including but not limited to CSMA/CD (Carrier Sense Multiple Access LANs with Collision Detection) Ethernet IEEE 802.3, Wi-FI Wireless LAN IEEE 802.11, Wireless Personal Area Network IEEE 802.15, Broadband Wireless Access IEEE 802.16, Broadband, HomePlug® and Home-PNA™ networks.

As used herein, the term network node refers to a network enabled device, which includes but is not limited to, access control, surveillance, video monitoring, video recording, environmental monitoring, voice over IP, and intercom functionality. As used herein, the term address refers to a portion of a network protocol and is used to select a particular device. For example, if the network node communicated using the TCP/IP protocol, an address might be an IP address (e.g. 192.168.0.223) which is set statically or obtained from a server (e.g. a DHCP server).

Figure 1:
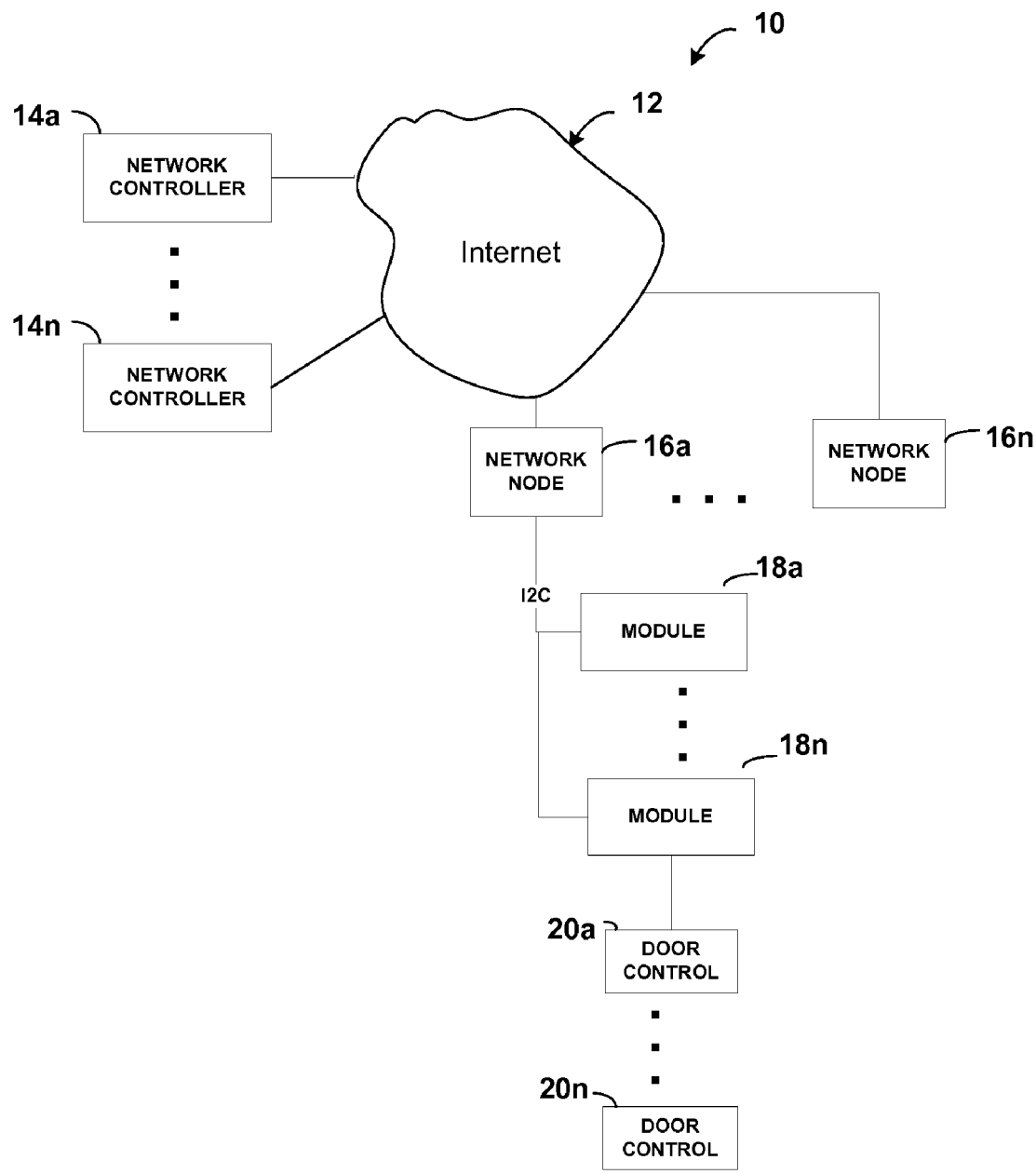
FIG. 1 is a block diagram of a security system having network controllers controlling the operation of network nodes over the Internet according to the invention.

Now referring to FIG. 1, an integrated security system 10 includes one or more network controllers 14a-14n (generally referred to as network controllers 14) and one or more network nodes 16a-16n (generally referred to as network nodes 16). A network 12 (e.g. the Internet or a LAN) allows the interconnection of the network controllers 14 and the network nodes 16. Each network node is coupled to one or more modules 18a-18n. Each module 18 is coupled to one or more door control devices 20a-20n. In one embodiment, the network node 16 identifies itself using a unique identifier, obtains a network configuration, discovers the address of one of the network controllers 14, connects to the network controller 14, receives application configuration data from the network controller 14 and operates the modules 18 and door control devices 20 to provide access control functionality.

Figure 2:
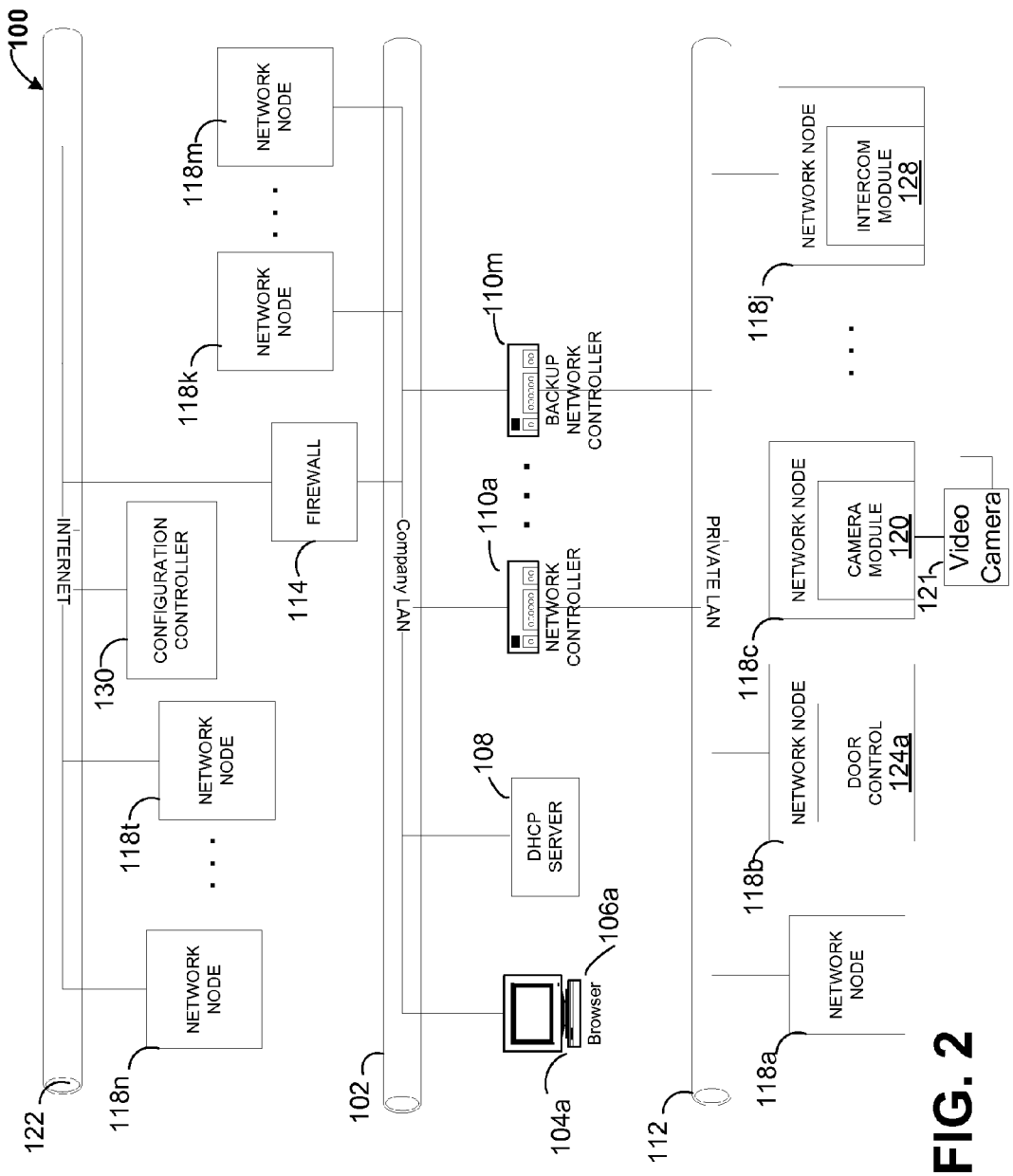
FIG. 2 is a schematic block diagram of a security system including network controllers and network nodes providing access control, video recording and surveillance, and intercom functionality operating on a private LAN, a corporate LAN and over the Internet according to the invention.

Now referring to FIG. 2, an exemplary network enabled integrated security system 100 includes a plurality of user PCs (personal computers) 104a-104m running a plurality of commercially available browsers 106a-106m (generally referred to as browser 106 or web browser 106), and DHCP server 108, each coupled to a company local area network (LAN) 102. The system 100 further includes one or more network controllers 110a-110m (generally referred to as network controller 110) coupled to the company LAN 102 and a portion of a private LAN 112 (shown at one access point for clarity). An optional firewall 114 couples the company LAN 102 to an Internet connection 122. It will be appreciated by those of ordinary skill in the art that the company LAN 102 and a portion of the private LAN 112 could be provided by a single physical network, a single network including one or more virtual LANs (VLANs), or network segments coupled by routers, bridges and switches (not shown). It is understood, that the DHCP functionality can be provided by a router, the network controller 100 or another system coupled to the network (LAN) 102.

The network enabled integrated security system 100 includes in one embodiment a plurality of network nodes 118a-118t. Here, network node 118b provides access control functionality including door control 124a, network node 118c provides video surveillance functionality including camera module 120 coupled to at least one video camera 121, and network node 118j provides intercom functionality including intercom module 128. Network nodes 118a, 118b, 118c, 118j and nodes 118k-118t are coupled to a portion of the private LAN 112 and are also collectively referred to as network nodes 118 or network enabled devices 118. The common components of the network node 118 are described below in conjunction with FIG. 4. Additionally a network node 118 could include video recording functionality or other features related to environmental monitoring, communications, biometric devices, surveillance or data collection, for example.

The private LAN 112 is, in some embodiments, a packet network and the physical implementation includes but is not limited to Ethernet type wiring (e.g., 10/100/1000 BaseT), HomePlug® or HomePNA™ network (i.e. communication over power lines or phone wiring), fiber, and wireless communication. It will be appreciated by those of ordinary skill in the art that the company LAN 102 and the private LAN 112 can each optionally include additional segments interconnected by routers, bridges, firewalls and other communications devices and each LAN 102, 112 can be connected to the Internet and that the company LAN 102 can include the private LAN 112, and the system 100 can operated over a single LAN.

Optionally network nodes 118k-118m are coupled to the company LAN 102. This allows flexibility in the placement of security system 100 functionality where it is required. For remote operation network nodes 118n-118t are coupled to the Internet connection 122. A configuration controller 130 is also coupled to the Internet connection 122.

In operation, the network controller 110 provides a web server accessible to one or more administrative users using the browsers 106a-106m. The network controller 110 provides address assignment methods in response to discovery requests from the network nodes 118a-118j and 118k-118m. On subnets with are not directly addressable by the network controller 110, the configuration controller 130 provides address assignment methods and configuration information to network nodes 118n-118n so that the network nodes 118n-118t can connect to the network controller 110.

It is understood that multiple users can access the web server from the multiple browsers 106a-106m, and that security can be provided by various means including but not limited to biometric identification, secure socket layer (SSL), virtual LANs, virtual private networks (VPN) and secure web server protocols HTTPS. The network enabled devices can be coupled to the private LAN 112 using CAT5E or CAT6 wiring, a HomePlug® interface, or any other interface which supports a TCP/IP protocol. The network controller 110 performs dynamic host configuration protocol (DHCP) functions when this service is not available on the company LAN 102.

Figure 3:
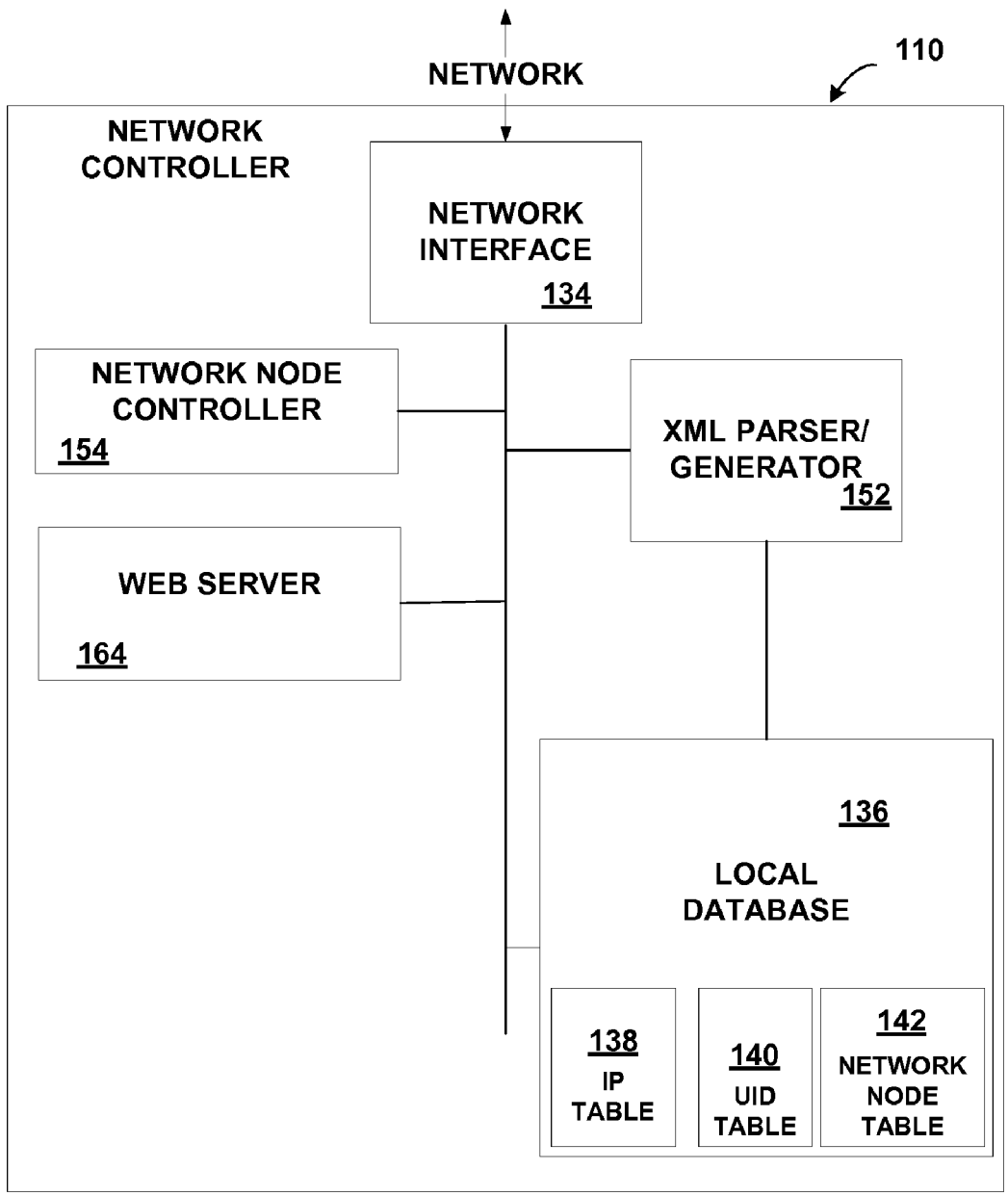
FIG. 3 is a block diagram of a network controller similar to network controller of FIG. 2.

Now referring to FIG. 3 in which like reference numbers indicate like elements of FIG. 2, an exemplary network controller 110 includes a network interface 134 coupled to the company LAN 102. A web server 164, a database 136, an XML parser/generator 152, a network node controller 154 are each coupled to the company LAN 102 through the network interface 134 and also coupled to the private LAN 112. It will be appreciated by those of ordinary skill in the art that not all of these components are required in each application. The blocks denoted "processor," "servers," "controller," and "database," can represent computer software instructions or groups of instructions. Such processing maybe performed by a single processing apparatus which may, for example, be provided as part of network controller 110. Alternatively, the blocks represent steps performed by functionally equivalent circuits such as a digital signal processor circuit or an application specific integrated circuit (ASIC).

The database 146, in one embodiment is a MySQL™ database and includes a network node table 142, an IP table 138 and a UID table 140. The network node table 142 includes fields related to a network node object, for example, UID, name, IP address, status, confirmed flag, IP address method, net mask, gateway of the node fields. It is understood that the object and configuration information can be represented in one or more tables and in tables with different names and fields. In this embodiment, the web server 164 is a GoAhead® web server running both the hyper text transfer protocol (HTTP) and the secure hyper text transfer protocol (HTTPS) protocols.

In operation, the network controller 110 provides administration and application support through an embedded web server 164 coupled to the web browsers 106a-106m on the company LAN 102 and the private LAN 112 and serves as a point of integration for the plurality of network enabled devices. The network controller 110 operates either as networked device that can interact with other devices and computers on the company LAN 102, and in one embodiment is a microprocessor controlled embedded server.

The network node controller 154 serves as a point of configuration management for the plurality of network nodes 118. In one embodiment, the network node controller 154 provides diagnostics and heartbeats for monitoring the health of the communications paths between the network controller 110 and the network nodes 118. The XML parser/generator 152 supports the representation of the predetermined resource information and global events in an extensible markup language. In one embodiment, the XML parser/generator 152 includes a Unicoi Systems Inc. Fusion Embedded XML DOM parser.

In one embodiment, the web server 164 and the network node controller 154 and are coupled by an interprocess communications mechanism, for example shared memory (not shown). The network node controller 154 and the web server 164 are coupled to the database 136 using an applications programming interface (API). It will be appreciated by those of ordinary skill in the art that security for data transmissions on the company LAN 102 and the private LAN 112 can be provided by encryption and decryption techniques and the use of secure sockets SSL and IPSEC protocols as are known in the art. Encrypting the data, for example using 128-bit (or higher level) encryption, secures data exposed on the entire network (company LAN 102 or private LAN 112).

Figure 4:
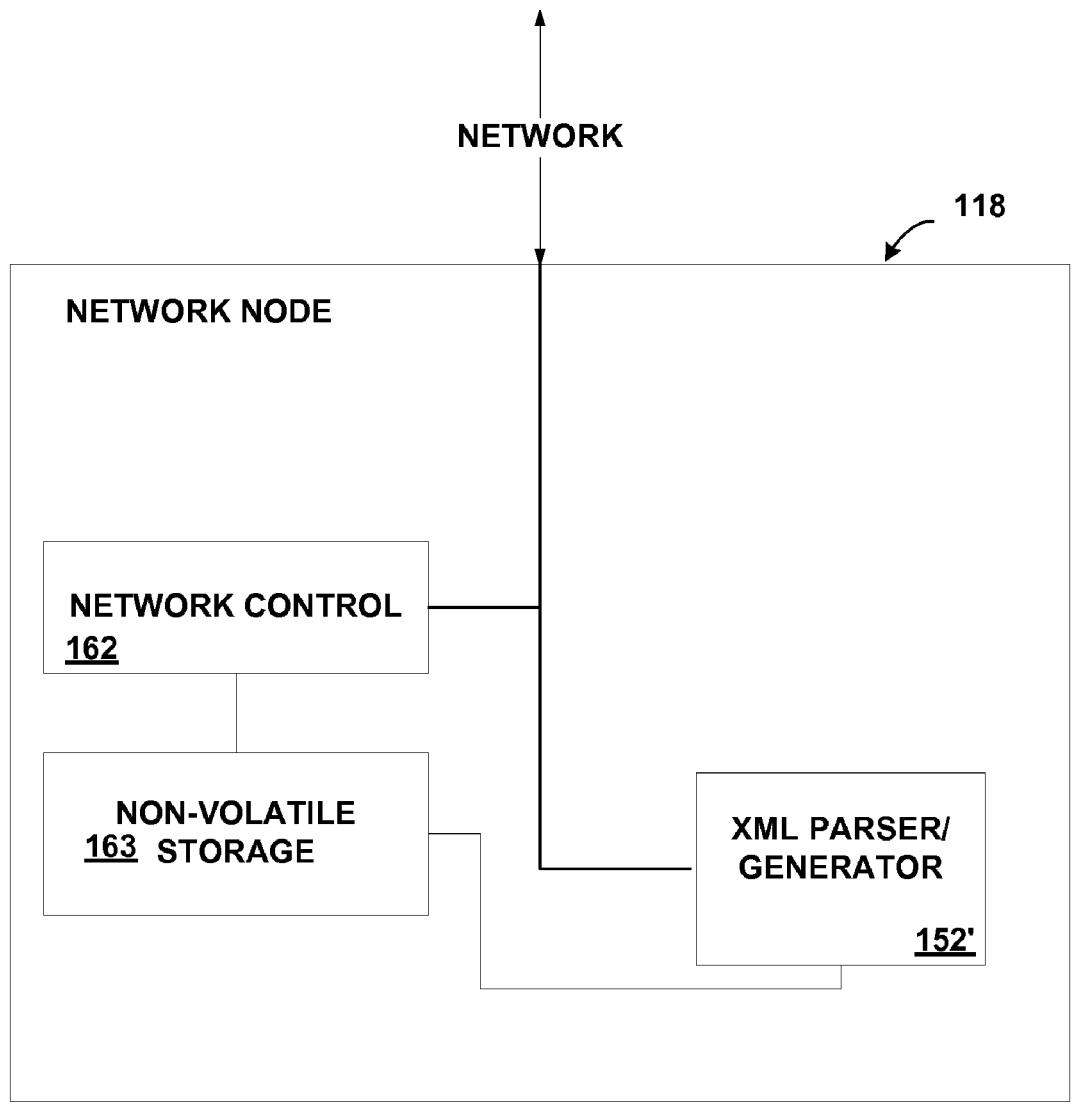
FIG. 4 is a block diagram of a network node similar to the network node of FIG. 2.

Now referring to FIG. 4, an exemplary network node 118 similar to the network nodes 118 of FIG. 2, includes a network control 162, non-volatile storage 163 and an XML parser/generator 152' similar to the XML parser/generator 152 of FIG. 3. In one embodiment the non-volatile storage 163 is implemented in battery backed SRAM which is non-volatile and is not erased if power to the network node 118 is interrupted. Alternatively, flash memory or EEPROM is used for this purpose. As described in more detail in conjunction with FIGS. 6, 7, and 8 the network node 118 communicates with the network node controller 154 (FIG. 3) located in the network controller 110. The network node controller 154 performs queries on database 146 (FIG. 3) to provide application configuration data to the network node 118. As described in more detail in conjunction with FIG. 10 the network node 118 communicates with a configuration controller (not shown) to acquire network configuration information.

Figure 5:
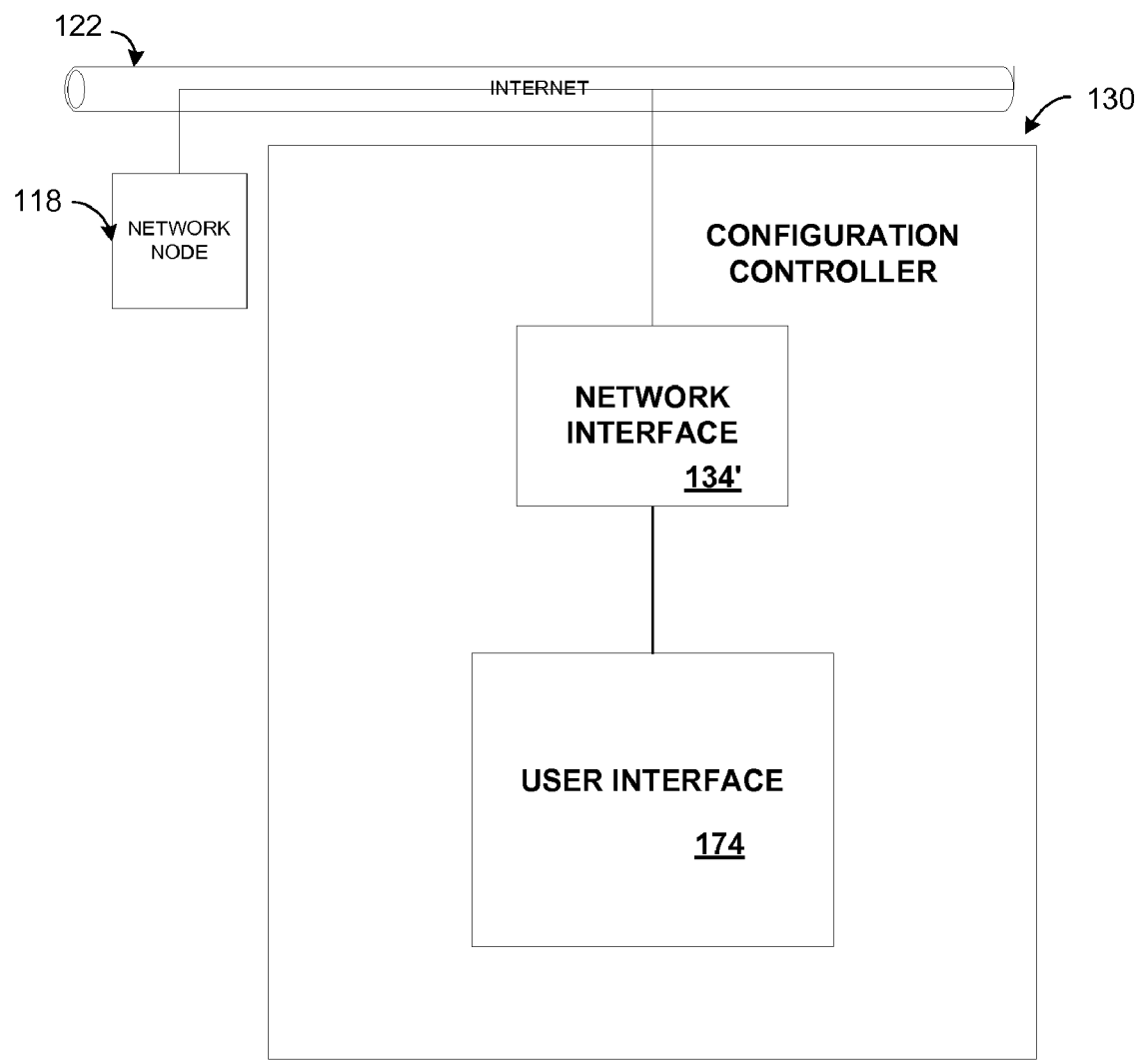
FIG. 5 is a block diagram of a configuration controller similar to the configuration controller of FIG. 2 for configuring the network node of FIG. 4.

Now referring to FIG. 5 in which like reference numbers indicate like elements of FIG. 2, an exemplary configuration controller 130 includes a network interface 134' coupled to a user interface 174. In one embodiment, the configuration controller 130 operates as an application program running on a personal computer. Although shown coupled to the Internet 122, the configuration controller 130 can communicate with the network node 118 over a private LAN, a corporate LAN, a virtual LAN (VLAN), or a virtual private network (VPN).

Figure 6:
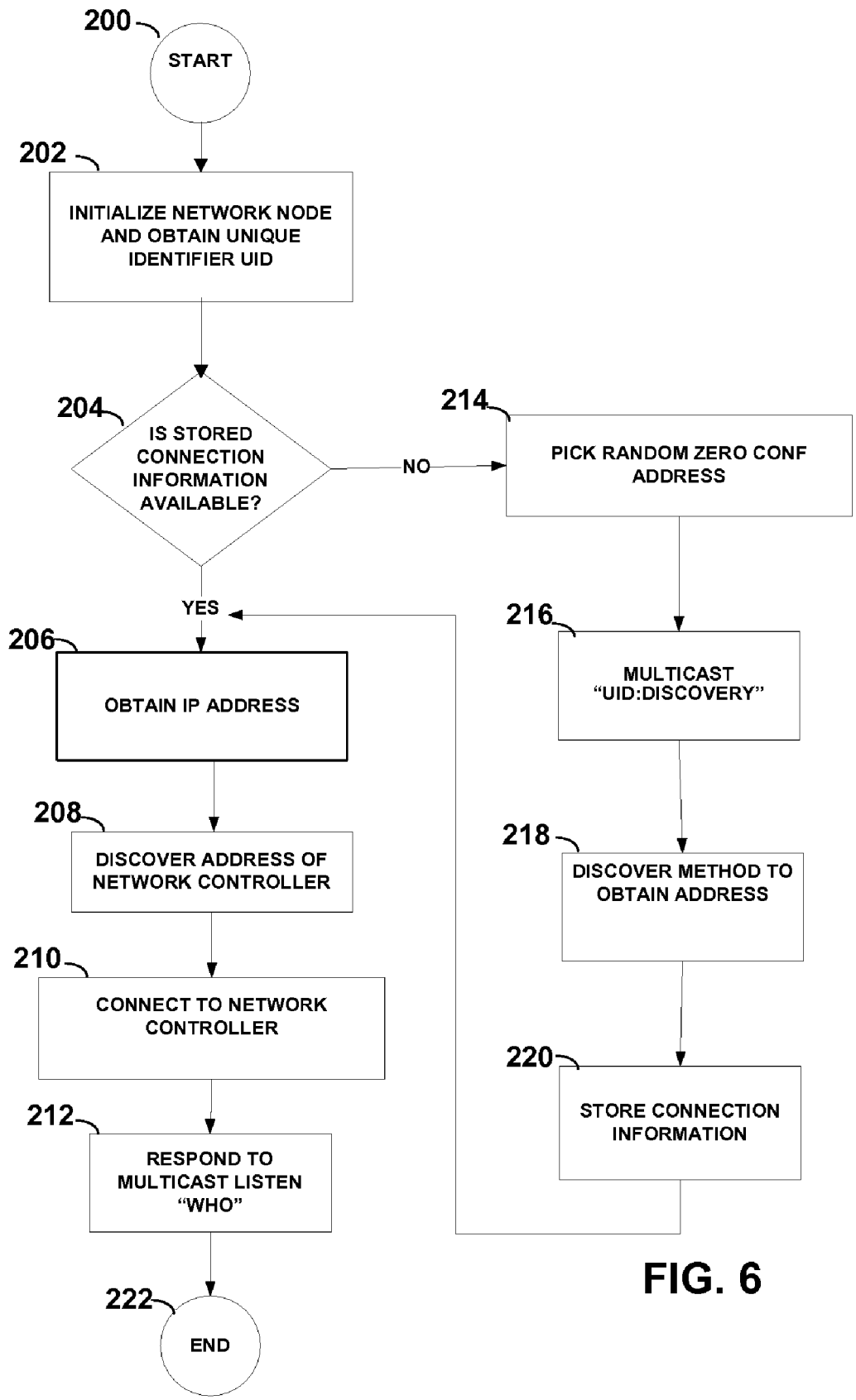
FIG. 6 is a flow diagram illustrating the steps to obtain an address, to discover an address of a network controller and to connect to a network controller according to the invention.

Turning now to FIG. 6, a flow diagram illustrates a process for a network node 118 to connect to a network controller 110. In the flow diagram of FIG. 6 the rectangular elements are herein denoted "processing blocks" (typified by element 202 in FIG. 6) and represent computer software instructions or groups of instructions. The diamond shaped elements in the flow diagrams are herein denoted "decision blocks" (typified by element 204 in FIG. 6) and represent computer software instructions or groups of instructions which affect the operation of the processing blocks, Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

In one embodiment, there at least are three ways for the network nodes 118 to acquire their IP addresses. In a first method, the DHCP server 108 on the network automatically assigns IP addresses to network nodes 118. In a second method a static IP address can be assigned to one or more network nodes. In a third method the network controller 110 can provide static IP addresses from a predetermined list of IP addresses (the operation of the DHCP server 108 should be coordinated with this method) to one or more of the network nodes 118. Generally IP addressing is provided by the DHCP server 108. However, there may be cases where the network controller 110 and the network nodes 118 to be controlled are on separate networks, a separate subnet, or a network with no DHCP server. In other cases a network administrator may wish to specify IP addresses (or a range of addresses) for the network controller 110 and the network nodes 118 even when there is a DHCP server 108 on the network. In this case the network controller 110 serves IP addresses to the network nodes 118. This variation of the third method is also referred to as pseudo-DHCP.

The process commences in step 200. In step 202, the network node 118 is initialized and obtains a unique identifier (UID). In one embodiment, the UID is obtained from a real time clock device having a readable unique 16 byte identifier (e.g., Maxim-Dallas Semiconductor DS2417 1-wire time chip). In another embodiment the UID is obtained from a licensing token. In step 204, it is determined whether stored connection information available. If it is determined that stored connection information available, an IP address is obtained in step 206 by using one of a plurality of address assignment methods stored in the non-volatile storage 163 and processing continues in step 208, otherwise processing continues in step 214.

In step 208, the network node 118 discovers the address of network controller 110. This process is described in more detail below in conjunction with FIG. 7. In step 210 the network node 118 connects to the network controller 110. At step 212, the network node 118, responds to multicast listen "who" messages to enable the operation of the configuration controller 130 as describe below in conjunction with FIGS. 9 and 10. It is understood that responding to "who" messages can continue as a background task. The discovery process terminates at step 222. At step 214, network node 118 has either been reset (e.g., manually, from a watchdog timer or a command from the network controller 110) or has never obtained an address. The network node 118 selecting a random zero conf address. In one embodiment the random address is based on a time obtained from a real time clock (not shown) on the network node 118. The random address could also be based on the UID of the network node 118. It is understood the random address may be based on a pseudo-random number. At step 216, the network node 118 multicasts a "UID:DISCOVERY" message and at step 218, the network node 118 discovers a method to obtain an address. At step 220, the network node 118 stores connection information in non-volatile storage 163 and processing resumes at step 206.

In one embodiment, after a network node 118 restarts it initially selects for itself a temporary random IP address in the zero-conf address space (169.254.X.Y where X and Y are randomly selected). The network node 118 then multicasts for a network controller 110 at 224.0.72.62 UDP port 7262, and presents its unique identifier (UID). The UID can be provided, for example, by a hardware token or data stored in non-volatile memory. The network controller 110 answers the multicast at 224.0.72.62 UDP port 7262 providing its own IP address and presents an addressing method for the network node 110. At step 222, the process terminates. In one embodiment, there are three IP addressing methods available: An existing DHCP server on the network can assign IP addresses. A Static IP address can be assigned using the configuration controller 130. The network controller 110 provides IP addresses to network nodes 118 from a specified address range. After an IP address for the network node 118 is selected further communications between network node 118 and network controller 110 occur directly between their respective IP addresses using TCP port 7262. TCP Port 7262 should be open to the network controller 110 for communications between the network controller 110 and network nodes 118 (i.e. the port should be open through routers and firewalls for any network nodes 118 on different subnets from the network controller 110.

Figure 7:
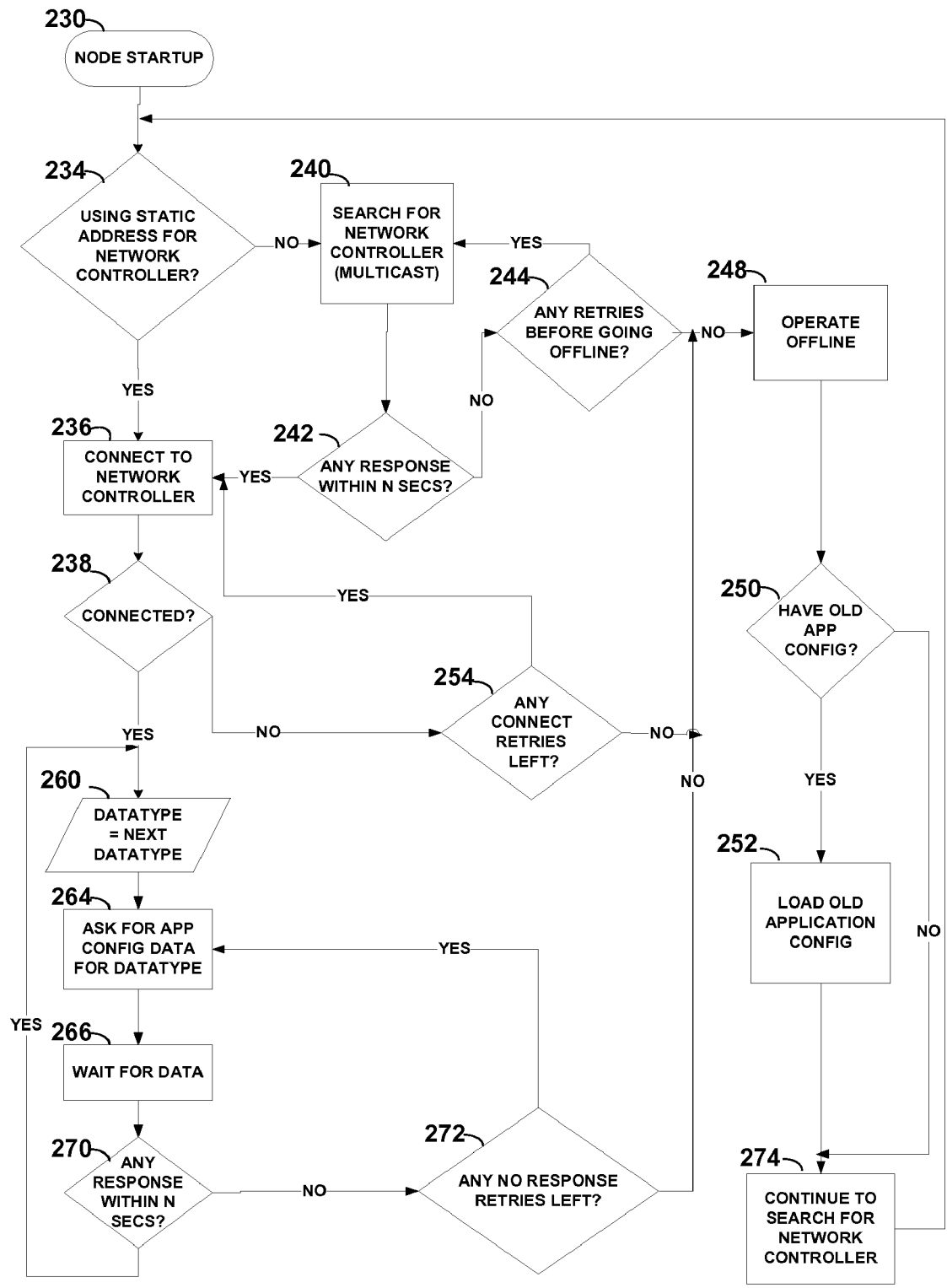
FIG. 7 is a flow diagram illustrating the steps to discover an address of a network controller according to the invention.

Now referring to FIG. 7 in which like reference numbers refer to like elements of FIGS. 2 and 4, a flow diagram illustrates a process for discovering the address of the network controller 110 and is a more detailed description of steps 208 and 210 of FIG. 6. At step 230, the node has obtained and address and is preparing to connect to the network controller 110. At step 234, it is determined whether the network node 118 is using a predetermined static address for the network controller 110. If it is determined that the network node 118 is using a predetermined static address for the network controller 110, the network node 118 tries to connect to the network controller 110 at step 236. At step 238, it is determined whether the network node 118 is connected to the network controller 110 by exchanging messages between the node 118 and the controller 110. If the network node 118 is connected, the process continues to download a collection of valid datatypes at steps 260 to 272, otherwise processing continues at step 254.

At step 240, the network node 118 searches for the address of the network controller 110 with a multicast message including in one embodiment as follows:

[UID]: NETWORKCONTROLLER, where [UID] is the 16 hex char unique id of the node (e.g. 6400000008BE3F27: NETWORKCONTROLLER).

Figure 8:
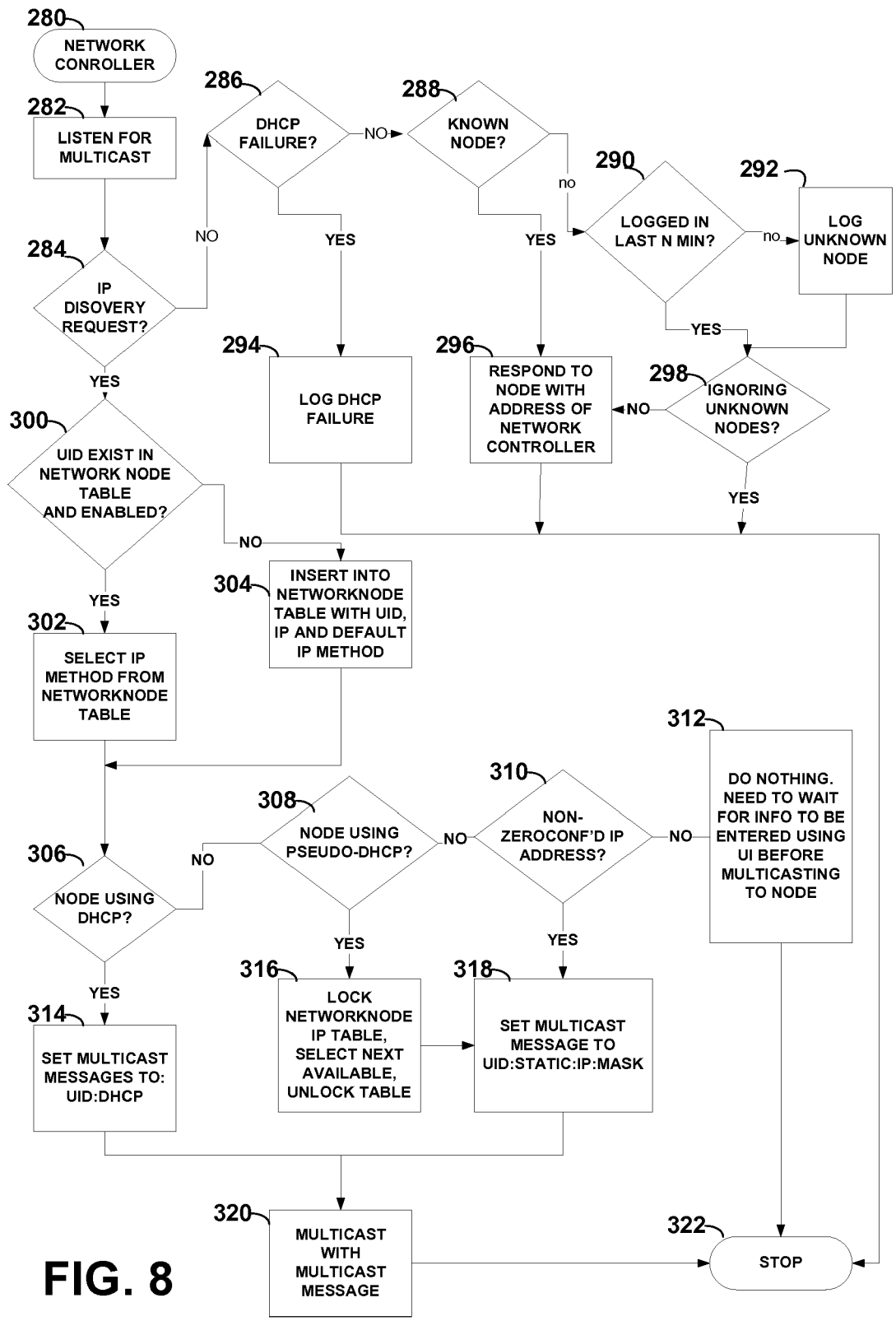
FIG. 8 is a flow diagram illustrating the steps to provide an address assignment method and configuration parameters according to the invention.

The response from the network controller 110 is described in more detail at steps 286-298 in FIG. 8. At step 242, the network node 118 determined whether there has been a response to the multicast within a predetermined period of time. If there has been a response including a network controller address, the network node 118 attempts to connect to the network controller 110 at step 236, otherwise, it is determined whether a predetermined retry count has been exceeded at step 244.

At step 244, if there are retries left, additional multicast messages are sent at step 240, otherwise a disconnect mode flag is set at step 248. The disconnect flag is set after a predetermined number of retries, then the network node 118 functions with last known good application configuration. The network node 118 continues to hunt for a network controller while running.

At step 250, a determination is made if an old stored system 100 application configuration exists. If the system 100 configuration exists, the old application configuration is loaded and the network node 118 operates offline (i.e. not connected to any network controller 110). If no old application configuration exists, the network node 118 is restarted with "invalid config" reason log message at step 274 and processing resumes at step 230 where the network node 118 continues to try to connect to a network controller 110. At step 254, it is determined whether there are any connect retry to be attempted. If there are retries, processing resumes at step 236, otherwise processing resumes at step 248.

Now referring to FIG. 8 in which like reference numbers refer to like elements of FIGS. 2 and 3, a flow diagram illustrates a process for providing an address assignment method to a network node 118 in response to a discovery request received by a network controller 110. The process commences in step 280 after the network controller 110 boots up and becomes operational. In step 282 the network controller's 110 network node controller 154 listens for multicast messages received from the network interface 134. In one embodiment the network controller 110 boots up and listens on TCP/IP port 7262 for network node 118 multicasts. In step 284, it is determined if a received multicast message is a discovery request. In one embodiment the discovery request message includes text "UID:DISCOVERY." For example 6400000008BE3F27: DISCOVERY.

If it is determined the multicast message does not include a discovery request to discover an address assignment method then processing continues at step 286, otherwise processing continues at step 300.

At step 286, it is determined whether the node failed to obtain an address from a DHCP server 108. If the network node 118 tries to obtain an address from the DHCP server 108 and the network node 118 fails, then the network node 118 will report that it failed the next time it connects to the network controller 110. If the network node 118 obtains an address, then there is no DHCP failure. If it is determined that the network node 118 failed to obtain an address from a DHCP server, a failure message is logged on the network controller in a log file in step 294 and processing stops for the current received message at step 322. If it is determined that the node did not fail to obtain an address from a DHCP server processing continues at step 288.

At step 288, the network node 118 is attempting to discover the IP address of the network controller 110 and it is determined whether the network node 118 is a network node 118 known by the network controller 110. In one embodiment, the determination of whether the network node 118 includes a determination whether the network node 118 has been enabled in the user interface as described below in conjunction with FIG. 11. If it is determined that the network node 118 is a network node 118 known by the network controller 110, the network controller 110 responds to network node 118 with the address of the network controller 110 at step 296 and processing stops for the current received message at step 322. It is understood that the network controller 110 can respond using, for example, a multicast message or by opening a TCP socket connection with network node 118. The network node 118 can determine the address of the network controller 110 from the multicast header, from a field in the multicast message or the TCP socket information. Steps 282, 288, 296 comprise a method to determine the IP address to the network controller which is referred to as Auto-Discovery. If it is determined that the network node 118 is not known by the network controller 110, processing continues at step 290.

At step 290, it is determined whether the network node 118 has been logged (i.e. a non-discovery message from the network node 118 has been received) by the network controller 110 in the last time interval, here a predetermined number N minutes. If it is determined that a non-discovery message from the network node 118 has been logged by the network controller 110 in the last predetermined time interval, it is further determined at step 298 whether the network controller 110 is ignoring unknown network nodes 118. If it is determined that the network controller 110 is ignoring unknown network nodes 118, processing stops for the current received message at step 322, otherwise processing resumes at step 296.

At step 300, it is determined whether the UID of the network node 118 exists in network node table. In one embodiment, the determination of whether the UID exists includes a determination whether the network node 118 associated with the UID has been enabled in the user interface as described below in conjunction with FIG. 11. In one embodiment, the database is a MySQL™ database and includes a UID table and an IP address table. If it is determined whether the UID of the network node 118 exists in network node table 142 processing continues at step 302 where an address assignment method, here a method to select an IP address is retrieved from the network node table, otherwise known data about network node 118 is inserted into the network node table 142 including UID, address, gateway, netmask, and default address assignment method at step 304.

At step 306, it is determined whether the network node is using DHCP address assignment. If the network node is using DHCP address assignment, a multicast message is setup including "uid:dhcp" at step 314 and processing continues at step 320, otherwise processing continues at step 308.

At step 308, it is determined whether the network node 118 is using PSEUDO-DHCP address assignment. If the network node 118 is using DHCP address assignment, the network controller 110 locks the network node address table in database 136, selects next available address, and unlocks the network node address table at step 316 and processing continues at step 318, otherwise processing continues at step 310.

At step 310, it is determined whether the network node 118 is using a non-zeroconf'd address. If the network node 118 is using a non-zeroconf'd address, processing continues at step 318, otherwise the network controller 110 waits for network configuration information to be entered in the User Interface before multicasting to the network node 118 or uses a static address stored in the network node table and processing stops at step 322.

At step 318, a multicast message is setup including uid:static:ip:mask and processing continues at step 320. At step 320, the multicast message setup in steps 314 or 318 is multicast so that it can be received by the network node 118 and processing terminates at step 322. At step 322, the current message processing is terminated and the network controller 110 resumes message processing at step 280. It is understood that steps 280-322 may be executed more than once before the network node 118 is configured and connected to the network controller 110.

Figure 9:
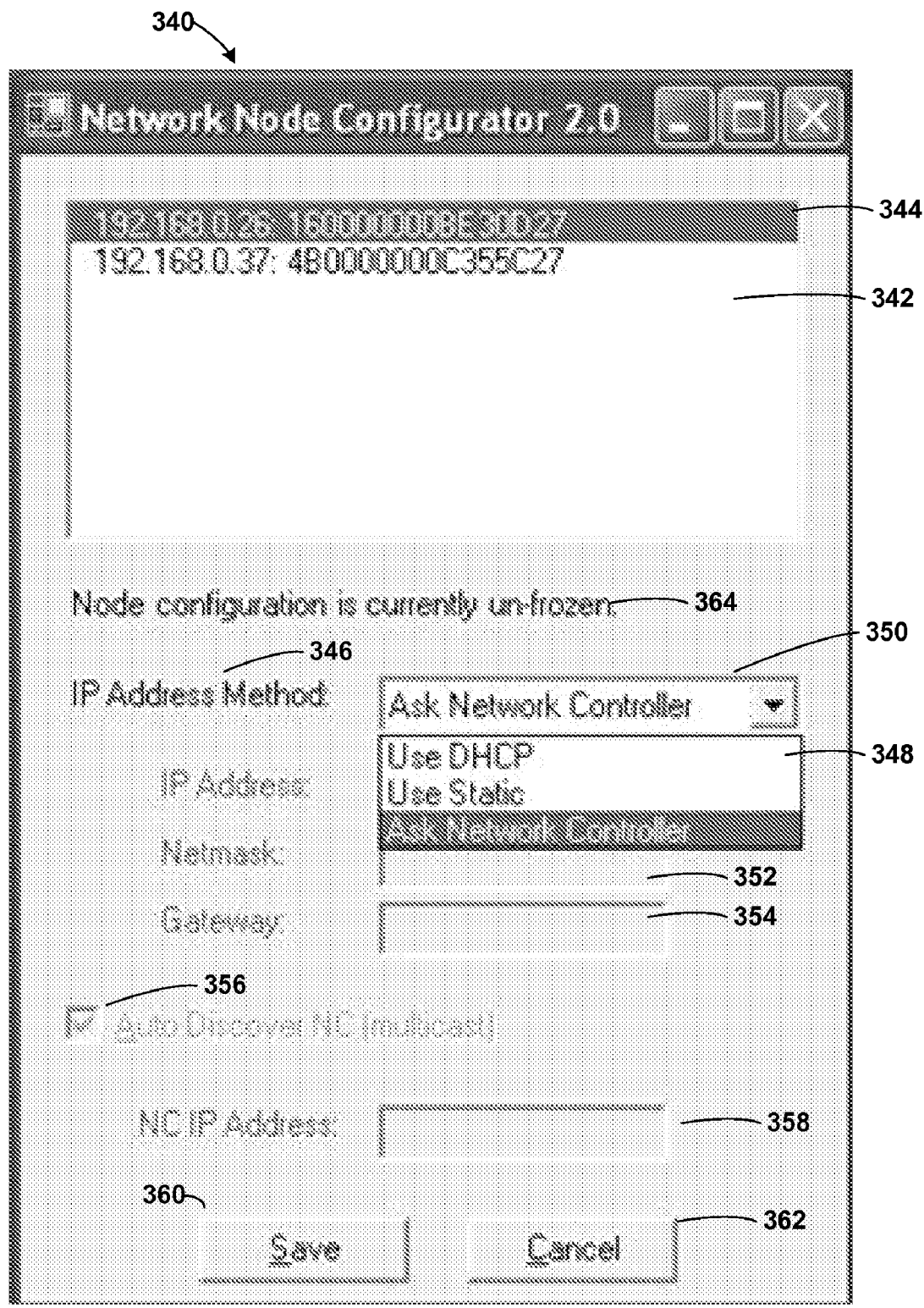
FIG. 9 is diagram of the user interface of the network node configuration controller described in FIG. 5.

Now referring to FIG. 9 in which like reference numbers refer to like elements of FIGS. 2 and 5, a network node configuration controller (also referred to as a Network Node Configurator) user interface 340 includes a display 342 of all the addressable nodes communicating on the same subnet as the network node configuration controller 130. The display 342, here, includes the IP address and UID of a selected network node at the top 344 of the display. The user interface 340 further includes an IP address method selection box 346 including the selected method drop down box 350 and a list of possible methods 348, a netmask fill-in box 352 and a gateway address fill-in box 354. The user can specify that the network node 118 should auto discover the network controller with check box 356 or directly supply a network controller address with fill-in text box 358.

The Auto-Discover check box 356 instructs the network node 118 to auto-discover the network controller 110. If the network controller 110 is on a separate subnet from the network node 118, the user should uncheck the Auto-Discover NC (multicast) checkbox 356 and enter the IP address of the network controller into the NC IP Address text box 358. The network node 118 subsequently uses address to find the network controller 110. In one embodiment, where the network controller is on a remote subnet, and some router or firewalls does not allow the network node 118 to connect with the network controller, it is necessary to open TCP Port, for example port 7262, to allow the network node 118 to connect to the network controller 110. Finally the display 342, includes a save button 360 and a cancel button 362.

In operation, user interface 340 allows selection of an addressing method to be communicated to the network node 118. From the display list 342, the network node 118 to be assigned an addressing method is selected. For example if the user wishes to assign a static IP address to the network node 118, STATIC is selected From the IP Address Method drop down box 350. In the IP Address textbox the static IP address is entered along with the Netmask and Gateway in text boxes 352 and 354 respectively. After clicking the Save button 360 the network node 118 receives the network configuration information including the static IP address that will not change until reassigned. A text message 364 appears when a network node 118 is selected to indicate whether the network configuration for the selected node has been locked "Frozen" or unlocked "Un-Frozen." If the selected node has been "Frozen," then the network node configuration controller 130 cannot change the selected network node's address or address method until the selected network node has been "unfrozen" by the network controller 110.

Figure 10:
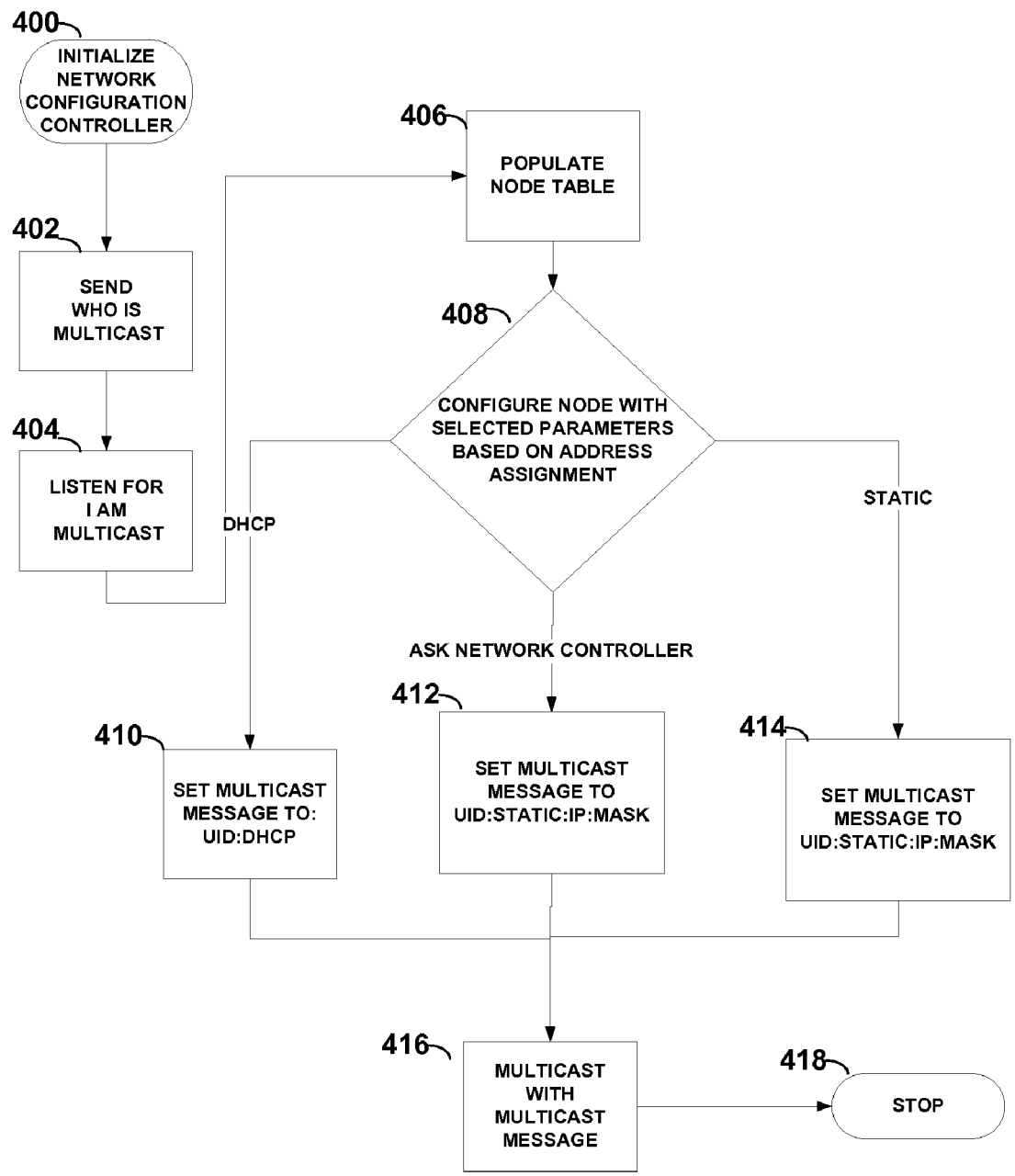
FIG. 10 is a flow diagram illustrating the steps to provide an address discovery method and configuration parameters according to the invention.

Now referring to FIG. 10 in which like reference numbers refer to like elements of FIGS. 2, 4 and 5, a flow diagram illustrates a process for configuring a network node 118 connected to a network segment which does not include a network controller 110 or connected to a network segment where the network node 118 is assigned a static address. The process starts at step 400 when a user initializes the configuration controller application. In one embodiment the network node configuration controller 130 is implemented as an application using the Microsoft™ .NET Framework v 1.1, and is installed on a network connected computer on the on the same subnet as the network node 118. It will be appreciated by those of ordinary skill in the art, that the application could be an automated process. The configuration controller 130 determines which network nodes 118 are available for possible configuration on the same subnet by sending "who is" multicasts at step 402 and listens for network node 118 multicast "IAM" messages at step 404. At step 406, the configuration controller 130 lists all nodes that respond in the display of all the addressable nodes 342, here a list box. In one embodiment, the configuration controller 130 multicasts the "who" message every 2 seconds. The "IAM message includes the IP address and method. At step 408, the configuration controller 130 configures each selected network node with selected parameters according to the address assignment. If DHCP address assignment is selected (indicated by :DHCP=1 in the IAM message), a multicast message is setup including uid: dhcp at step 410 and processing continues at step 416.

If pseudo-DHCP (i.e. Ask Network Controller) or STATIC address assignment is selected (indicated by :DHCP=0 in the IAM message), a multicast message is setup including uid: static:ip:mask at step 412 and processing continues at step 416. At step 416, the multicast message setup in steps 410, 412 or 414 is multicast so that it can be received by the network node 118 and processing terminates at step 418. At step 418, the configuration controller 130 application is terminated or continues to populate the node table waiting for the user to select additional network nodes 118 to configure.

Figure 11:
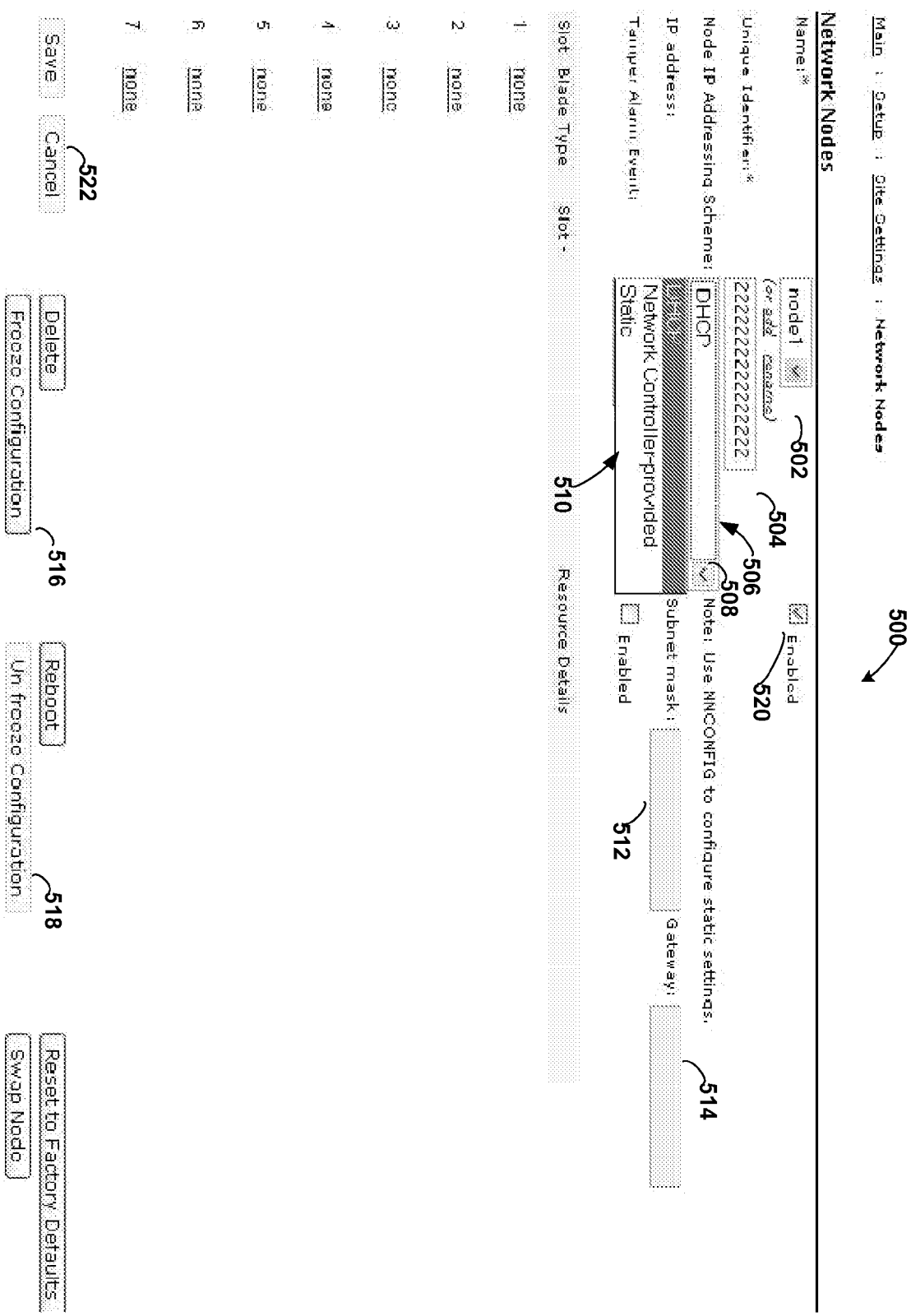
FIG. 11 is a diagram of the user interface of a network controller node setup utility.

Now referring to FIG. 11 in which like reference numbers refer to like elements of FIGS. 2 and 5, a network controller configuration user interface 500 interfaces with a network controller network node setup utility operating on a network controller 110 to setup a network node 118. The network controller configuration user interface 500 includes a node selection box 502 including the addressable nodes communicating on the same subnet as the network controller 110. The node selection box 502, here, includes the name a selected network node and a Unique Identifier box 504 includes the UID of the selected node. The user interface 500 further includes a Node IP addressing scheme selection box 506 including the selected method drop down box 508 and a list of possible methods, a subnet mask fill-in box 512 and a gateway address fill-in box 514. The user can specify that the network node 118 configuration can not be changed (e.g. address of network controller, the network node IP address, addressing method) when "Frozen" with check box 516 or can be changed when "Unfrozen" with check box 518. In one embodiment, a system administrator logs into the web server 164 to "unfreeze" the network node 118. Enable box 520. In one embodiment the NC responds to enabled node using settings on Network Node Page. The node is enabled in this embodiment by checking enable box 520.

In operation, user interface 500 allows selection of an addressing method to be communicated to the network node 118 from the network controller 110. From the node selection box 502, the network node 118 to be assigned an addressing method is selected. For example if the user wishes to assign a static IP address to the network node 118, STATIC is selected From the Node IP addressing scheme selection box 506. In the IP Address textbox the static IP address is entered along with the Netmask and Gateway in text boxes 512 and 514 respectively. After clicking check box Save 522 the network node 118 receives the network configuration information from the network controller 110.

Figure 12:
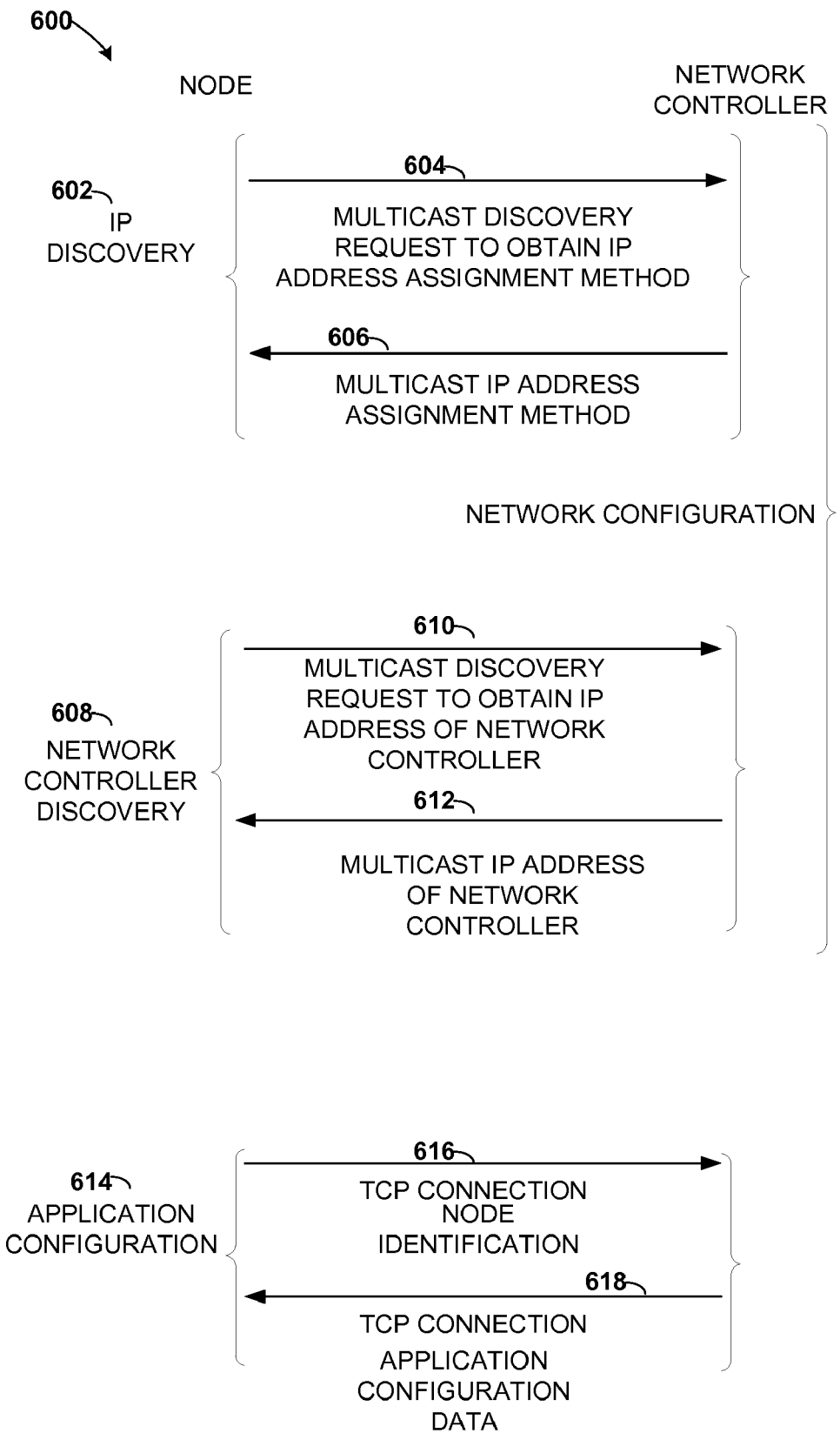
FIG. 12 is a data flow diagram illustrating a typical discovery sequence between the network controller and the network node according to the invention.

FIG. 12 illustrates data communicated between the network node 118 and the network controller 110 during an exemplary network configuration session in dataflow diagram 600. The IP Discovery phase 602 the network node 118 issues message 604, here a multicast message requesting an IP address assignment method from the network controller 110. In response to message 604, the network controller 110 multicast the IP address assignment method to be used by the network node 118 in message 606. After the network node 118 has obtained an IP address by using the method indicated in message 606, the network node 118 attempts to discover the address of the network controller 110 as indicated by the network controller discovery transactions 608. In this embodiment the network node 118 multicasts a discovery request 610. The network controller 110 responds by multicasting its IP address in message 612. After the network node 118 has obtained an IP address and the IP address of the network controller 110 which will supply network configuration information, the network node 118 initiates the network configuration sequence 614. In certain network topologies (e.g., the network controller 110 and the network node 118 are on separate LANs connected via the Internet), the network node 118 cannot initially communicate with the network controller 110 requiring the network node configuration controller 130 to configure the network node 118 using, in one embodiment, transactions described below in FIG. 13.

Figure 13:
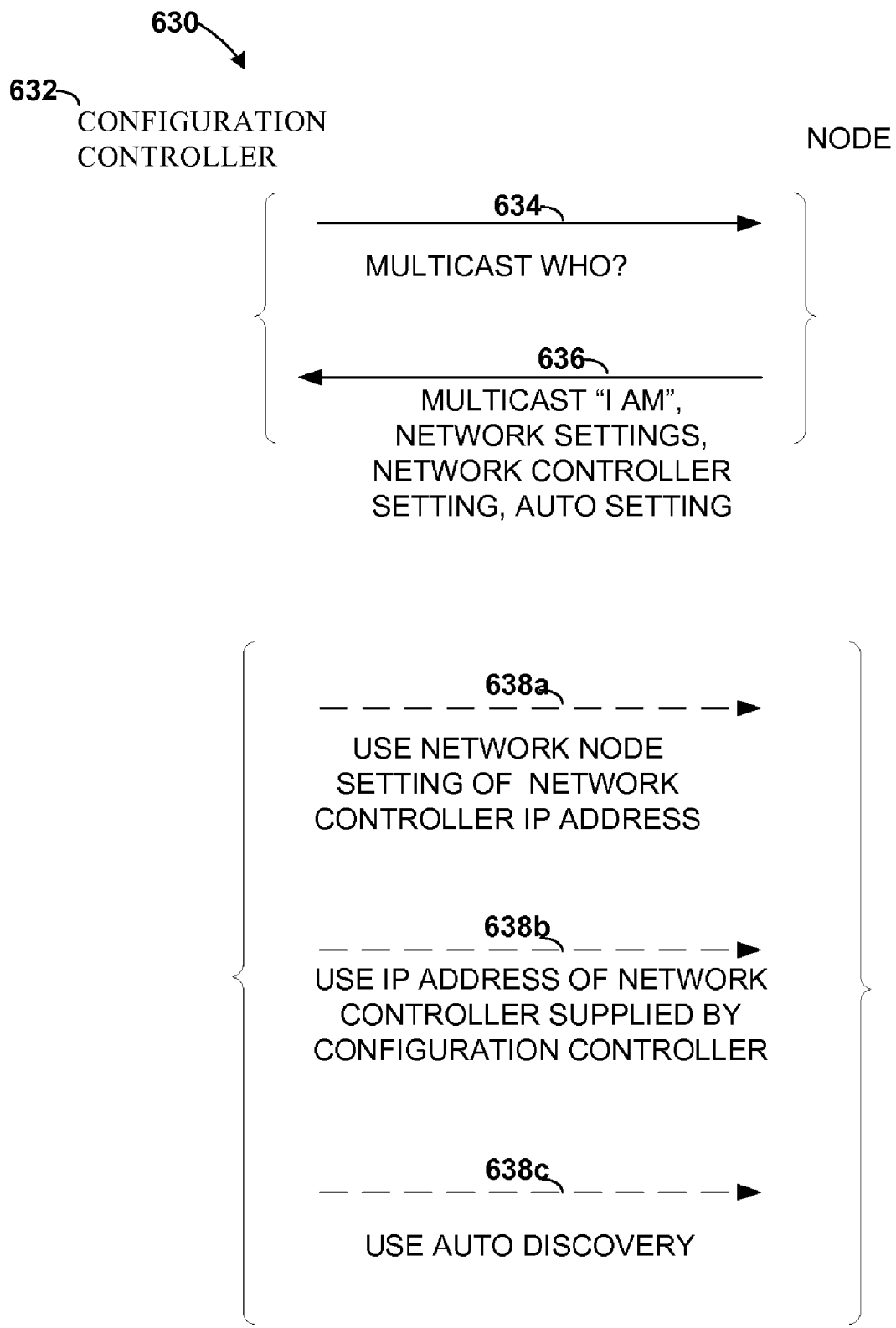
FIG. 13 is a data flow diagram illustrating a typical configuration session between the configuration controller and the network node according to the invention.

With reference to FIG. 13, dataflow diagram 630 depicts the transactions between the network node configuration controller 130 and the network node 118. After an instance of the network node configuration controller 130 is started, in one embodiment by running a network node configuration controller 130 on a personal computer, the network node configuration controller 130 determines which network nodes 118 are configurable by multicasting a "WHO" message 634. Operational network nodes 118 respond to message 634 with an "I AM" response 636.

An exemplary "I AM" response is:
220000000C4CAB27:IAM:DHCP=1:
MASK=255.255.255.0:GATE=192.168.1.1: NETWORKCONTROLLER=0: NETWORKCONTROLLER_IP=192.168.1.240:LOCK=0 includes the UID, current DHCP status, IP mask and gateway values, known network controller 110 address, NETWORKCONTROLLER_IP; and an indication whether the network configuration is locked. NETWORKCONTROLLER=0: indicates that the network controller's 110 IP address in the network node 118 has been dynamically configured and obtains the network controller's 110 IP address by performing Auto-Discovery as described above in conjunction with step 282 in FIG. 8. each time the network node 118 restarts. NETWORKCONTROLLER=1: indicates that the network controller's 110 IP address in the node has been statically configured, and the static configuration is set by the network node configuration controller 130 setup the network controller's 110 IP address in contrast to using Auto-Discovery. Depending on the options selected by an operator through the user interface, the network node configuration controller 130 sends one of network controller IP address messages 638a, 638b or 638c to the network node 118 to indicate how the network node 118 is to determine the corresponding network controller 110 address.

All publications and references cited herein are expressly incorporated herein by reference in their entirety. Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. An integrated security system operating over a network comprising:
    at least one network node, including a processor, coupled to said network and coupled to at least one door control device, the node comprising:
        a Media Access Control (MAC) address;
        a node unique identifier;
        a control program stored on a computer readable storage medium and executable on said network node to perform the operations of:
            reading a token coupled to the network node to obtain the node unique identifier;
            selecting a random zero conf address;
            providing a discovery message including the random zero conf address, the node unique identifier and the MAC address;
            requesting an address assignment method by multicasting the discovery message; and
    a network controller, including a processor, coupled to the network including a control program stored on a computer readable storage medium and executable by said network controller to perform the operations of:
        receiving a user selection of the address assignment method;
        selecting the address assignment method in response to receiving the discovery message;
        directing said network node to obtain a network configuration including a network address using the selected address assignment method.

2. The system of claim 1 wherein the address assignment method is one of:
    DHCP assignment method;
    static address assignment method; and
    pseudo-DHCP assignment method.

3. The system of claim 2 further comprising a user interface accessible via a browser used to select one of the address assignment methods.

4. The system of claim 3 wherein the user interface is further used to freeze the network configuration of the at least one network node.

5. The system of claim 1 further comprising a configuration controller including a network interface coupled to the network; and
    a user interface coupled to said network interface adapted to accept network node network configuration information and to display a list of addressable network nodes including corresponding node unique identifier, wherein the configuration controller distributes network configuration information to selected ones of the nodes from the list of addressable nodes.

6. The system of claim 5 wherein the user interface provides an interface to assign a static address to the at least one network node.

7. The system of claim 5 wherein the address assignment method is one of:
    DHCP assignment;
    static address assignment; and
    pseudo-DHCP assignment.

8. The system of claim 5 wherein the user interface provides an interface to assign a network controller address to the at least one network node.

9. The system of claim 8 wherein the user interface to assign the network controller address allows the user to select one of:
    directing the at least one network node to use a predetermined network controller address;
    directing the at least one network node to use a statically assigned network controller address; and
    directing the at least one network node to auto discover the network controller address.

10. The system of claim 1 wherein said network controller is on a first subnet and said network node is on a different second subnet.

11. The system of claim 1 wherein the token is physically coupled to said network node.

12. A computer-implemented method for configuring a network node in which at least one computer system executes software code retrieved from storage to perform the operations of:
- reading a token coupled to a network node to obtain a node unique identifier;
- selecting a random zero conf address;
- providing a discovery message including the random zero conf address, the node unique identifier and a MAC address;
- requesting an address assignment method by multicasting the discovery message; and
- discovering the address of a network controller.

13. The method of claim 12 wherein selecting a random zero conf address comprises basing the random address on a time obtained from a real time clock.

14. The method of claim 12 discovering the address of least one network controller by using at least one of a multicast response and a TCP/IP connection.

15. The method of claim 12 further comprising supplying access control application configuration data to the network node.

16. The method of claim 12 further comprising multicasting an "I AM" message in response to a "WHO IS" message to determine network nodes configurable on a selected subnet.

17. A computer-implemented method for configuring a network node in which at least one computer system executes software code retrieved from storage to perform operations of:
- determining whether a network node is available for possible configuration;
- receiving an initial network node configuration;
- selecting a random zero conf address;
- providing a message including the random zero conf address, a node unique identifier and a MAC address;
- providing an address assignment method; and
- providing a method to discover a corresponding network controller address.

18. The method of claim 17 wherein determining whether a network node is available further comprises broadcasting a request for network configuration from at least one network node.

19. The method of claim 18 further comprising responding to the request for network configuration by multicasting a response including network configuration information.

20. The method of claim 17 further comprising multicasting a node unique identifier in the response to the message.

* * * * *